United States Patent
Bonchonsky et al.

(10) Patent No.: US 7,374,601 B2
(45) Date of Patent: May 20, 2008

(54) AIR SEPARATION SYSTEM AND METHOD WITH MODULATED WARNING FLOW

(75) Inventors: Michael J. Bonchonsky, Costa Mesa, CA (US); Steven C. Dow, Fountain Valley, CA (US); Robert F. Golles, San Clemente, CA (US); Bryan D. Jensen, Mission Viejo, CA (US); Mike Bonchonsky, Foothill Ranch, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 280 days.

(21) Appl. No.: 10/946,899

(22) Filed: Sep. 22, 2004

(65) Prior Publication Data

US 2005/0092177 A1    May 5, 2005

Related U.S. Application Data

(60) Provisional application No. 60/503,813, filed on Sep. 22, 2003.

(51) Int. Cl.
*B01D 53/04* (2006.01)
*B01D 53/22* (2006.01)
*B64D 37/00* (2006.01)
*B65B 1/04* (2006.01)

(52) U.S. Cl. .................. 95/138; 95/1; 95/45; 95/47; 95/23; 95/14; 95/18; 95/54; 96/4; 96/422; 96/8; 96/10; 141/1; 141/64; 141/62; 141/63

(58) Field of Classification Search ............... 95/138, 95/23, 45, 47, 1, 54; 96/4, 422
See application file for complete search history.

(56) References Cited

U.S. PATENT DOCUMENTS

| 4,397,661 A | 8/1983 | King et al. | |
|---|---|---|---|
| 4,556,180 A | 12/1985 | Manatt | |
| 5,013,331 A | 5/1991 | Edwards et al. | |
| 6,491,739 B1 * | 12/2002 | Crome et al. | 95/14 |
| 6,547,188 B2 * | 4/2003 | Schmutz et al. | 244/135 R |
| 6,585,192 B2 | 7/2003 | Beers | |
| 6,729,359 B2 * | 5/2004 | Jones | 141/1 |
| 6,997,970 B2 * | 2/2006 | Crome | 95/8 |

FOREIGN PATENT DOCUMENTS

| FR | WO 00/00389 | * | 1/2000 |
|---|---|---|---|
| WO | WO 00/00389 | * | 1/2000 |

* cited by examiner

*Primary Examiner*—Duane Smith
*Assistant Examiner*—Ives Wu
(74) *Attorney, Agent, or Firm*—Renner, Otto, Boisselle & Sklar, LLP.

(57) ABSTRACT

An inerting system and method characterized by a primary air separation module configured to communicate with an upstream source of pressurized air at elevated temperature for production of a primary downstream flow of nitrogen-enriched air to be delivered to a space to be inerted; a secondary air separation module configured to communicate with the upstream source of pressurized air at elevated temperature for production of a supplemental downstream flow of nitrogen-enriched air to be delivered to a space to be inerted when high nitrogen-enriched airflow is desired during a high flow period; and a flow controller configured to provide a warming flow through the secondary air separation module to heat the secondary air separation module to above ambient temperature during a warming period other than the high flow period.

10 Claims, 2 Drawing Sheets

AIR SEPARATION SYSTEM AND METHOD WITH MODULATED WARNING FLOW

RELATED APPLICATION DATA

This application claims the benefit of U.S. Provisional Application No. 60/503,813 filed Sep. 22, 2003, which is hereby incorporated herein in its entirety.

FIELD OF THE INVENTION

The invention herein described relates generally to air separation systems and methods and particularly those that supply nitrogen enriched air to spaces to be inerted, such as the ullage space in an aircraft fuel tank.

BACKGROUND OF THE INVENTION

Aircraft have used on-board inert gas generating systems (OBIGGS) to protect against fuel tank explosions by replacing the potentially explosive fuel vapor/air mixture above the fuel in the ullage space of the tanks with nitrogen-enriched air (NEA). The NEA is generated by separating oxygen from local, ambient air and pumping the inert, oxygen impoverished NEA into the tanks.

Production of NEA typically is carried out by means of an apparatus relying on permeable membranes, or else on molecular sieves. The air separation apparatus is generally referred to as an air separation module (ASM). A selectively permeable membrane ASM typically comprises a bundle of hollow fiber membranes packaged in a cylindrical shell with an inlet and outlet at the ends of the shell, and a shell side vent port. When pressurized air enters the ASM shell and passes through the hollow fibers, oxygen is separated from the air stream due to diffusion through the fiber walls. That is, the fiber walls are more permeable to oxygen than nitrogen. The oxygen exits through the side vent port and can be recaptured, but often the oxygen is considered a waste gas that is exhausted overboard. The remaining NEA flows out of the ASM via the outlet port and is distributed to the ullage space of the fuel tank or tanks for the purpose of inerting the fuel tanks and thereby reducing flammability. The ASM operates most efficiently, in terms of permeability of oxygen over nitrogen, at an elevated temperature higher than ambient temperature. The selective permeability has a direct relationship to the purity of the NEA (the more nitrogen and less oxygen, the higher the purity).

In many if not most commercial airplane applications, pressurized air used for NEA generation will originate from either an engine bleed or from a cabin air pressure source. With an engine bleed pressure supply, compressed hot air is ducted from an engine bleed air supply line and then cooled by a heat exchanger to an optimal temperature for maximum ASM performance. This use of engine bleed air can decrease engine performance and can lead to increased fuel consumption. Accordingly, it is desirable to limit the amount of engine bleed air that is needed during the various segments of the aircraft flight profile and particularly during cruise.

In a known OBIGGS architecture, plural ASMs are provided to allow for low NEA flow from a primary ASM during the cruise phase of an aircraft flight profile and high NEA flow from both the primary and one or more additional secondary ASMs during aircraft descent. During cruise, the primary ASM receives a steady flow of pressurized air at a controlled temperature, thereby maintaining the primary ASM at a desired operating temperature for providing a high purity NEA. The secondary ASMs, however, are idle, i.e. shut off from the elevated temperature supply air, and can become thermally soaked at surrounding ambient bay temperatures considerably lower than the optimal operating temperature of the ASM. Consequently, when the pressurized heated supply air is supplied to the secondary ASMs for high NEA flow during descent, initially the secondary ASMs will not be at the desired elevated temperature and thus will produce low purity NEA.

SUMMARY OF THE INVENTION

The present invention provides an air separation system and method wherein a warming flow through one or more of the secondary ASMs is modulated to provide for improved efficiency of the secondary ASMs when high purity NEA flow is desired, as during aircraft descent.

According to one aspect of the invention, an inerting system comprises a primary air separation module configured to communicate with an upstream source of pressurized air at elevated temperature for production of a primary downstream flow of nitrogen-enriched air to be delivered to a space to be inerted; a secondary air separation module configured to communicate with the upstream source of pressurized air at elevated temperature for production of a supplemental downstream flow of nitrogen-enriched air to be delivered to a space to be inerted when high nitrogen-enriched air flow is desired during a high flow period; and a flow controller configured to provide a warming flow through the secondary air separation module to heat the secondary air separation module to above ambient temperature during a warming period other than the high flow period.

In an embodiment, a main secondary outlet flow line is connected to the outlet of the secondary air separation module for delivery of the outlet flow of the secondary air separation module to the space to be inerted, and the flow controller comprises a main secondary outlet flow control valve for controlling flow through the a main secondary outlet flow line.

In an embodiment, a warming flow bypass line is connected to the main secondary outlet flow line at a first location upstream of the main secondary outlet flow control valve for diverting outlet flow of the secondary air separation module away from the space to be inerted, and the flow controller includes a warming flow control valve for controlling flow through the bypass line during periods other than the high flow period.

In an embodiment, a main secondary inlet flow line is connected to the inlet of the secondary air separation module for delivery of the pressurized air at elevated temperature to the secondary air separation module, and the flow controller comprises a main secondary inlet control valve for controlling flow through the main secondary inlet flow line. The flow controller can further include control circuitry for commanding the warming flow control valve and the main secondary inlet control valve to an open condition and the main secondary outlet flow control valve to a closed condition during the warming periods, thereby to allow flow of the pressurized air at elevated temperature to the secondary air separation module and diversion of the outlet flow of the secondary air separation module away from the space to be inerted.

In an embodiment, the main secondary outlet flow line includes a main outlet flow restriction downstream of said first location, and the warming flow bypass line includes a bypass flow restriction that restricts flow to a greater extent than the main outlet flow restriction, such that a major portion of the flow will flow through main secondary outlet control valve when open than through the warming flow bypass line.

In an embodiment, the outlet flow of the secondary air separation module can flow through the warming flow bypass line when the main secondary outlet control valve is open to allow for a warming flow through the secondary air separation module.

When the inerting system is employed in an aircraft including a fuel tank to which the primary and supplemental downstream flows of nitrogen-enriched air are supplied, the high flow period corresponds with descent of the aircraft.

In an aircraft embodiment, the flow controller operates to provide a warming flow through the secondary air separation module to heat the secondary air separation module during ascent of the aircraft.

According to another aspect of the invention, an inerting method comprising the steps of using a primary air separation module for production of a primary downstream flow of nitrogen-enriched air to be delivered to a space to be inerted; using a secondary air separation module for production of a supplemental downstream flow of nitrogen-enriched air to be delivered to a space to be inerted when high nitrogen-enriched air flow is desired during a high flow period; and providing a warming flow of pressurized air at elevated temperature through the secondary air separation module to heat the secondary air separation module to above ambient temperature during a warming period other than the high flow period.

Further features of the present invention will become apparent to those skilled in the art upon reviewing the following detailed description and attached drawings.

DETAILED DESCRIPTION

Figure 1:
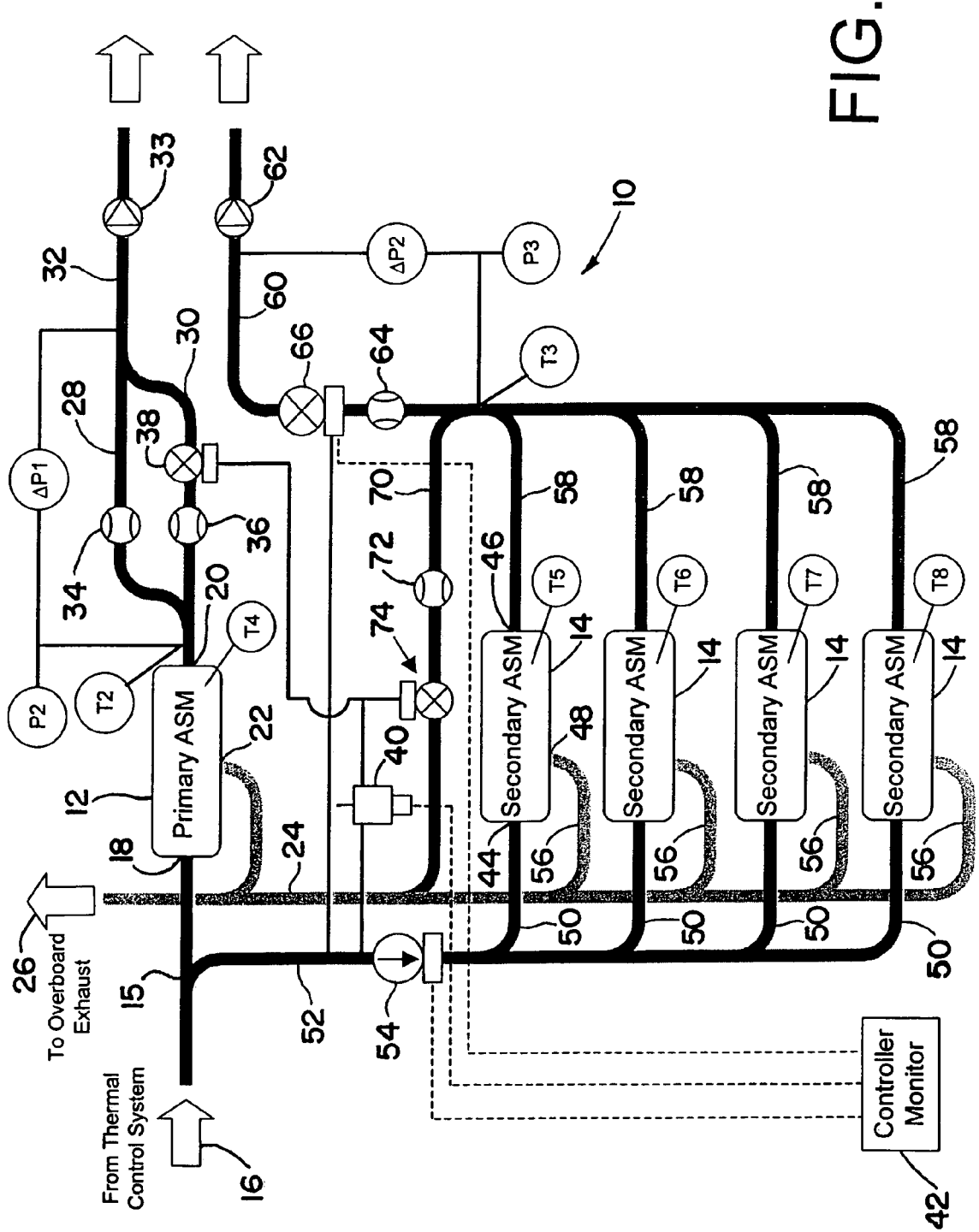
FIG. 1 is a schematic view of one embodiment of an air separation system according to the invention, which has particular application in an on-board inert gas generating system of an aircraft.

Referring now in detail to the drawings and initially to FIG. 1, an exemplary embodiment of an air separation system according to the invention is indicated generally by reference numeral 10. The illustrated system 10 is designed for use in an on-board inert gas generating system of an aircraft that supplies nitrogen-enriched air (NEA) to the fuel tank or tanks of an aircraft, and thus will chiefly be designed in this context. It will be appreciated, however, that the NEA can be used for inerting cargo holds and other void spaces in an aircraft. Moreover, the underlying principles of the invention have applicability to non-aircraft applications where a need exists for a supply of relatively inert, nitrogen-enriched air.

The system 10 generally comprises a primary air separation module 12 and one or more secondary air separation modules 14. Usually only one primary air separation module (ASM) will be utilized to produce nitrogen-enriched air (NEA) from a suitable supply source, although additional primary ASMs could be used if higher capacity is desired. As discussed further below, the primary ASM can be operated in a low flow mode to supply high purity NEA to the ullage space of the aircraft fuel tanks at a rate sufficient to compensate for the increase in such ullage space as fuel is consumed from the tanks during the cruise segment of the aircraft flight plan. During aircraft descent, substantially higher flow of NEA is needed. To provide this higher flow, the primary ASM can be operated in a high flow mode, and the one or more secondary ASMs can be operated to meet the flow requirements needed to maintain a non-explosive atmosphere in the fuel tanks, such as an oxygen level in the ullage space less than about 10%-14% oxygen, and more particularly less than about 12% oxygen, if not lower.

In the illustrated embodiment the primary ASM 12 is provided via a supply line 15 with a continuous supply of air at elevated temperature and elevated pressure (conditioned air). Any suitable supply can be used, such as cabin pressure source or engine bleed air. Engine bleed air supplied from taps in the turbine section of the aircraft engines typically will be at too high a temperature for optimal efficiency of the ASM. For this reason, the engine bleed air can be cooled by passage through a heat exchanger (not shown) of a thermal control system 16 to which the supply line 15 is connected. The bleed air can also be filtered to remove particulates and/or moisture before passage to the primary ASM.

The primary ASM 12, as well as the secondary ASMs 14, can be of any suitable type. In the illustrated embodiment, the primary ASM is a selectively permeable membrane ASM. The primary ASM 12 includes a bundle of hollow fiber membranes packaged in a cylindrical shell with an inlet port 18 and outlet port 20 at the ends of the shell, and a shell side vent port 22. When pressurized air enters the ASM shell and passes through the hollow fibers, oxygen is separated from the air stream due to diffusion through the fiber walls, the fiber walls being more permeable to oxygen than nitrogen. The oxygen exits through the side vent port 22 and can be recaptured, although more often the oxygen will be exhausted overboard via an exhaust line 24 connected to an overboard exhaust 26. The remaining NEA flows out of the ASM via the outlet port 20.

In the illustrated exemplary embodiment, the outlet port 20 is connected by parallel-connected lines 28 and 30 to a primary outlet flow line 32 that leads to the aircraft fuel tank or tanks and which is provided with a check valve 33 to prevent back-flow. A primary low flow orifice 34 (or other suitable flow restriction device) is provided in line 28 while the other line 30 is provided with a high flow orifice 36 (or other suitable flow restriction device) and a primary high flow control valve 38. The primary high flow control valve 38 is controlled by a three-way solenoid valve 40 that is commanded by a controller 42.

During aircraft cruise the primary high flow control valve 38 will be closed so that the outlet flow of the primary ASM 12 passes through the primary low flow orifice 34 that is sized to provide a desired flow rate through the primary ASM for optimal efficiency. At lower flow rates a high nitrogen purity can be achieved, with oxygen making up for example only about one percent by volume of the NEA. If desired the low flow orifice 34 can be a stepped or variable orifice and an oxygen sensor (not shown) can be provided to provide signals representing oxygen content of the NEA, which signals can be used to control the orifice size to provide NEA having a dynamically controlled level of purity.

For aircraft descent (or other high flow period), the primary high flow control valve 38 will be open to allow the output of the primary ASM 12 to flow not only through the low flow orifice 34 but also through the high flow orifice 36 that permits higher flow rates than obtained when output flow is directed only through the primary low flow orifice 34. At the higher flow rate the oxygen content of the NEA will be higher, such as about nine to ten percent by volume.

During aircraft descent (or other "high flow period" where a high flow rate of NEA is needed for inerting purposes) the output of the primary ASM 12 is supplemented by the secondary ASMs 14. The secondary ASMs 14 each can be a selectively permeable membrane ASM and thus each has an inlet port 44, outlet port 46 and side vent port 48. The inlet ports 44 of the secondary ASMs are connected by respective branch inlet lines 50 to a secondary supply line 52 that in turn is connected to the supply line 15. The secondary supply line 52 is provided with a secondary inlet flow control valve 54 that controls the supply of the conditioned air to the secondary ASMs. The side vent ports 48 of the secondary ASMs are connected to branch vent lines 56 to the exhaust line 24. The outlet ports 46 of the secondary ASMs are connected by respective branch outlet lines 58 to a main secondary outlet flow line 60 that leads to the aircraft fuel tank or tanks and which is provided with a check valve 62 to prevent back-flow. A main secondary flow orifice 64 (or other suitable flow restriction device) is provided in the main secondary outlet flow line 60 for flow rate control. The main secondary outlet flow line 60 also is provided with a main secondary output flow control valve 66 that is commanded by the controller 42.

During aircraft cruise the main secondary output flow control valve 66 will be closed so that only the outlet flow of the primary ASM 12 is supplied to the fuel tank or tanks. During aircraft descent (or other high flow period), the main secondary output flow control valve 66 will be open along with the secondary inlet flow control valve 54 to allow conditioned air to flow into the secondary ASMs for production of NEA and delivery to the fuel tank or tanks.

With the foregoing architecture, low NEA flow is provided from the primary ASM 12 during the cruise phase of an aircraft flight profile and high NEA flow from both the primary and the secondary ASMs 12 and 14 during aircraft descent. During cruise, the primary ASM 12 receives a steady flow of pressurized air at a controlled elevated (above ambient) temperature, thereby maintaining the primary ASM at a desired operating temperature for providing a high purity NEA. The secondary ASMs 14, however, will be idle, i.e. shut off from the heated supply air, and can become thermally soaked at surrounding ambient bay temperatures considerably lower than the optimal operating temperature of the ASM. Consequently, when the pressurized heated supply air is supplied to the secondary ASMs for high NEA flow during descent, initially the secondary ASMs will not be at the desired elevated temperature and thus will produce very low purity NEA.

In accordance with the present invention, a warming flow bypass line 70 is connected to the main secondary outlet flow line 60 at a first location upstream of the main secondary outlet flow control valve 66 for diverting outlet flow of the secondary ASMs 14 to the exhaust line 24 for exhausting overboard. The bypass line 70 is provided with a warming flow orifice 72 (or other flow restriction device) that is sized to provide a desired warming flow rate through the secondary ASMs. This flow rate could be higher, lower or the same as that determined by the main secondary output flow orifice 64. The warming flow bypass line 70 is also provided with a warming flow control valve 74 for controlling flow through the bypass line 70 during periods other than the high flow period. The warming flow control valve can be controlled by the three-way solenoid valve 40 that is commanded by the controller 42.

During aircraft cruise the warming flow control valve 74 can be operated in different manners. It can be open during cruise to provide a continuous warming flow through the secondary ASMs 14, such as at a low "trickle" rate if a low flow warming flow orifice 72 is provided. Alternatively, the warming flow control valve can be closed during cruise and then opened just prior to the high flow period when high flow NEA is needed. When the warming flow control valve is open along with the secondary inlet flow control valve 54, conditioned air from the air supply line 15 will be supplied to the secondary ASMs to preheat them prior to opening the main secondary output flow control valve 66. Consequently, the very low purity NEA produced by the secondary ASMs during warmup will be dumped overboard instead of being passed to the fuel tank or tanks. The primary high flow control valve 38 can be opened at the same time as the warming flow control valve 74 to provide for increased flow from the primary NEA that is already operating at desired temperature and consequently some increased flow of NEA to the fuel tank or tanks prior to the high flow period when the secondary ASMs are outputting NEA to the fuel tank or tanks. After sufficient warming, the warming flow control valve 74 is closed and the main secondary output flow control valve 66 is opened to supply NEA from the "warmed" secondary ASMs to the fuel tank or tanks.

Warming flow through the secondary ASMs 14 can be commanded as a function of the flight profile (such as a prescribed time before descent), rate of change of altitude or pressure, manually such as by manually engaging a switch in the cockpit prior to or at the beginning of a descent, or otherwise. Cessation of warming flow and commencement of the high flow period can be commanded as a function of the preheat time, actual measurement of temperature conditions, such as the temperature of the NEA outputted by the secondary ASMs, or otherwise. A typical warmup time is about 10 minutes.

Figure 2:
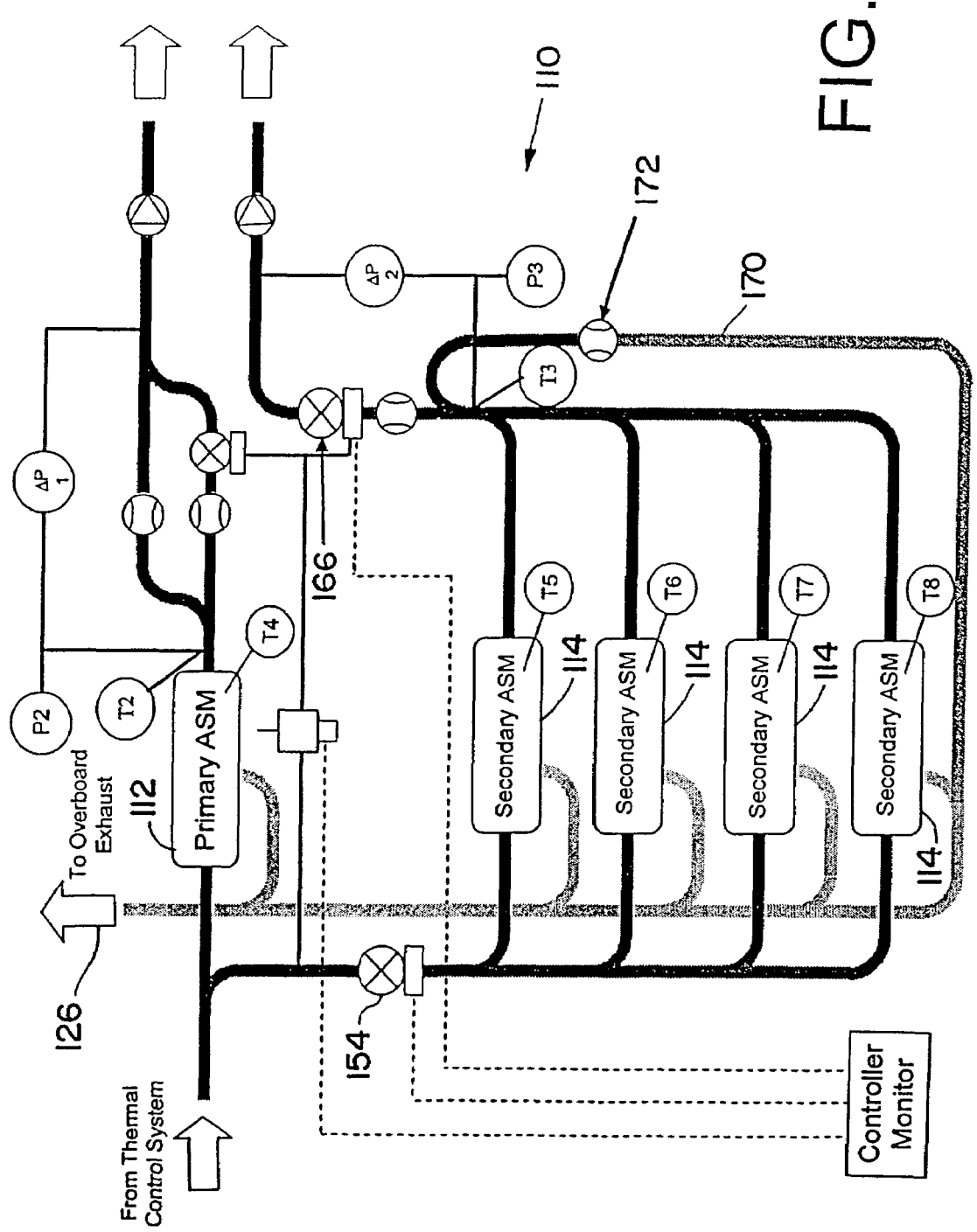
FIG. 2 is a schematic view of another embodiment of an air separation system according to the invention.

Referring now to FIG. 2, another embodiment of an air separation system according to the invention is indicated generally by reference numeral 110. The system 110 is substantially the same as the system shown in FIG. 1 and consequently like reference numerals are used to identify similar parts except the numbers have been incremented by 100. Accordingly, the system generally comprises a primary ASM 112 and one or more secondary ASMs 114.

While similar, the system 110 differs from the system 10 by the omission of warming flow control valve 74. In addition, the secondary inlet flow control valve 154 can be commanded open not only during descent but also during cruise. Accordingly, there will always be flow of conditioned air through the secondary ASMs 114 to keep them warm. During cruise the main secondary output flow control valve 166 will be closed so that the output of the secondary ASMs will be exhausted overboard via the warming flow bypass line 170. The warming flow orifice 172 (or other flow restricting device) can be sized to provide in effect a trickle flow sufficient to keep the secondary ASMs reasonably warm while minimizing the amount of bleed air being consumed during cruise.

For descent, the main secondary output flow control valve 166 is open to allow the NEA output of the secondary ASMs 114 to flow to the fuel tank or tanks. The main secondary output flow orifice 164 in the main secondary outlet flow line 160 will be substantially larger than the warming flow orifice 172 in the warming flow bypass line 170 so that a majority and more preferably substantially all of the NEA produced by the secondary ASMs 114 will flow to the fuel tank or tanks and only a nominal amount to the overboard exhaust 126.

A further embodiment of air separation system according to the invention is substantially the same as the system 110, except the warming flow bypass line 170 and associated orifice 172 are eliminated. In this embodiment, warming flow is effected by opening the secondary inlet flow control valve 154 and secondary output flow control valve 166 during assent to preheat the secondary ASMs 114. Preferably the secondary ASMs are insulated relative to the surrounding environment to retain the heat inputted during such preheating. During such preheating the low purity NEA will flow to the fuel tank or tanks, but this is relatively inconsequential during assent. For cruise, the secondary inlet flow control valve 154 and secondary output flow control valve 166 are closed. When the aircraft is about to descend or has initiated a descent, once again the secondary inlet flow control valve 154 and secondary output flow control valve 166 can be opened to provide high flow of NEA. Because of the preheat, the secondary ASMs can still be at an elevated temperature and provide a higher purity NEA than if no preheat had been provided. Generally this technique is more suitable for shorter flights.

As depicted in FIGS. 1 and 2, various temperature sensors (T2-T8) and pressure sensors (P2, P3, ΔP1, ΔP2) can be provided as desired to monitor system parameters and provide inputs to the controller 42, for use as desired in effecting control of the air separation systems.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. An inerting system, comprising:
    a primary air separation module configured to communicate with an upstream source of pressurized air at elevated temperature for production of a primary downstream flow of nitrogen-enriched air to be delivered to a space to be inerted;
    a secondary air separation module configured to communicate with the upstream source of pressurized air at elevated temperature for production of a supplemental downstream flow of nitrogen-enriched air to be delivered to a space to be inerted when high nitrogen-enriched air flow is desired during a high flow period;
    a flow controller configured to provide a warming flow through the secondary air separation module to heat the secondary air separation module to above ambient temperature during a warming period other than the high flow period;
    a main secondary outlet flow line connected to the outlet of the secondary air separation module for delivery of the outlet flow of the secondary air separation module to the space to be inerted, and wherein the flow controller comprises a main secondary outlet flow control valve for controlling flow through the a main secondary outlet flow line; and
    a warming flow bypass line connected to the main secondary outlet flow line at a first location upstream of the main secondary outlet flow control valve for diverting outlet flow of the secondary air separation module away from the space to be inerted, wherein the warming flow bypass line diverts outlet flow of the secondary air separation module away from the inerting system during warm up.

2. An inerting system as set forth in claim 1, in combination with an aircraft including a fuel tank to which the primary and supplemental downstream flows of nitrogen-enriched air are supplied, and wherein the warming flow bypass line diverts outlet flow of the secondary air separation module overboard during the warm up.

3. An inerting system as set forth in claim 1, wherein the outlet flow of the secondary air separation module can flow through the warming flow bypass line when the main secondary outlet control valve is open to allow for a warming flow through the secondary air separation module.

4. An inerting system as set forth in claim 1, wherein the flow controller includes a warming flow control valve for controlling flow through the bypass line during periods other than the high flow period.

5. An inerting system as set forth in claim 4, comprising a main secondary inlet flow line connected to the inlet of the secondary air separation module for delivery of the pressurized air at elevated temperature to the secondary air separation module, and wherein the flow controller comprises a main secondary inlet control valve for controlling flow through the main secondary inlet flow line.

6. An inerting system, comprising:
    a primary air separation module configured to communicate with an upstream source of pressurized air at elevated temperature for production of a primary downstream flow of nitrogen-enriched air to be delivered to a space to be inerted;
    a secondary air separation module configured to communicate with the upstream source of pressurized air at elevated temperature for production of a supplemental downstream flow of nitrogen-enriched air to be delivered to a space to be inerted when high nitrogen-enriched air flow is desired during a high flow period;
    a flow controller configured to provide a warming flow through the secondary air separation module to heat the secondary air separation module to above ambient temperature during a warming period other than the high flow period;
    a main secondary outlet flow line connected to the outlet of the secondary air separation module for delivery of the outlet flow of the secondary air separation module to the space to be inerted, and wherein the flow controller comprises a main secondary outlet flow control valve for controlling flow through the a main secondary outlet flow line;
    a warming flow bypass line connected to the main secondary outlet flow line at a first location upstream of the main secondary outlet flow control valve for diverting outlet flow of the secondary air separation module away from the space to be inerted; and
    a main secondary inlet flow line connected to the inlet of the secondary air separation module for delivery of the pressurized air at elevated temperature to the secondary air separation module, and
    wherein the flow controller comprises a main secondary inlet control valve for controlling flow through the main secondary inlet flow line;
    wherein the flow controller includes a warming flow control valve for controlling flow through the bypass line during periods other than the high flow period; and wherein the flow controller includes control circuitry for commanding the warming flow control valve and the main secondary inlet control valve to an open condition and the main secondary outlet flow control valve to a closed condition during the warming periods, thereby to allow flow of the pressurized air at elevated temperature to the secondary air separation module and diversion of the outlet flow of the secondary air separation module away from the space to be inerted.

7. An inerting system as set forth in claim 1, wherein the main secondary outlet flow line includes a main outlet flow restriction downstream of said first location, and the warming flow bypass line includes a bypass flow restriction that restricts flow to a greater extent than the main outlet flow restriction, such that a major portion of the flow will flow through main secondary outlet control valve when open than through the warming flow bypass line.

8. An inerting system as set forth in claim 6, in combination with an aircraft including a fuel tank to which the primary and supplemental downstream flows of nitrogen-enriched air are supplied.

9. A combination as set forth in claim 8, wherein the high flow period corresponds with descent of the aircraft.

10. A combination as set forth in claim 9, wherein the flow controller operates to provide a warming flow through the secondary air separation module to heat the secondary air separation module during ascent of the aircraft.

* * * * *

UNITED STATES PATENT AND TRADEMARK OFFICE
CERTIFICATE OF CORRECTION

PATENT NO. : 7,374,601 B2  Page 1 of 1
APPLICATION NO. : 10/946899
DATED : May 20, 2008
INVENTOR(S) : Michael J. Bonchonsky et al.

It is certified that error appears in the above-identified patent and that said Letters Patent is hereby corrected as shown below:

Title Page, Item (54) Title and Column 1, Line 2, replace "WARNING" with --WARMING--.

Title Page, Item (75) Inventors: replace "Costa Mesa, CA (US)" with --Foothill Ranch, CA (US)--.

Title Page, Item (75) Inventors: remove "Mike Bonchonsky, Foothill Ranch, CA (US)".

Col. 7, Line 62, Remove "a".

Col. 8, Line 51, Claim 6, line 23, Remove "a".

Signed and Sealed this

Twenty-fifth Day of November, 2008

JON W. DUDAS
*Director of the United States Patent and Trademark Office*